United States Patent [19]
Nelson

[11] 3,710,547
[45] Jan. 16, 1973

[54] ADSORPTION PROCESS FOR NATURAL GAS PURIFICATION

[75] Inventor: Warren Leonard Nelson, Montreal, Quebec, Canada

[73] Assignee: AL E. & C. Ltd., Montreal, Quebec, Canada

[22] Filed: March 11, 1971

[21] Appl. No.: 123,301

[30] Foreign Application Priority Data

March 11, 1970 Great Britain.....................11,779/70

[52] U.S. Cl. .............................55/58, 55/62, 55/68
[51] Int. Cl. ..............................B01d 53/04
[58] Field of Search............55/58, 62, 70, 74, 75, 33, 55/31, 68

[56] References Cited

UNITED STATES PATENTS

| | | | |
|---|---|---|---|
| 2,992,703 | 7/1961 | Vasan et al................................ | 55/70 |
| 3,494,102 | 2/1970 | Dunn, Jr................................... | 55/62 |
| 3,365,859 | 1/1968 | Sandberg................................. | 55/58 |
| 3,085,379 | 4/1963 | Kiyonaga et al......................... | 55/58 |
| 3,221,477 | 12/1965 | Arnoldi et al. ........................... | 55/75 |
| 3,632,504 | 1/1972 | Barrere, Jr. et al..................... | 55/180 |

*Primary Examiner*—Charles N. Hart
*Attorney*—Alan Swabey

[57] ABSTRACT

A cyclic process of purification of gases containing at least two undesirable products by adsorption on a bed divided in at least two sections in which the regeneration is realized in a first stage by introducing on the adsorption bed countercurrently to the adsorption direction, after depressurizing, wherein the said gaseous mixture is obtained by combining with a given volume of reactivation gas a stream of gas coming out from between the two sections of the bed, a flow of said mixture equivalent to said volume of reactivation gas being passed through the first adsorption section.

4 Claims, 2 Drawing Figures

ADSORPTION PROCESS FOR NATURAL GAS PURIFICATION

BACKGROUND OF INVENTION

1. Field of Invention

The present invention relates to a cyclic process of purification of gases containing at least two undesirable products, or impurities, said gases being brought into contact with an adsorption bed divided in at least two adsorption sections or masses. More particularly, the invention relates to an improved process for the regeneration of the adsorption bed.

2. Description of Prior Art

It is known that gaseous products may be preferentially retained by adsorption masses. Each adsorption step, which consequently reduces the concentration of one or more components within the gas to be purified, said components being retained by the adsorption mass, is to be followed by a regeneration or desorption step, to extract the retained components from the adsorption mass. Said regeneration or desorption step may be realized by any known technique such as decompression, calorific addition, vacuum or pressure reduction, elution or similar.

The desorption by elution is generally obtained by countercurrent circulation on the adsorption mass, of a part of the pure product originated during the adsorption step. The adsorbed components are extracted through dissolution in the elution gas. This way of proceeding however, leads to a considerable reduction of the adsorption step efficiency, due to the amount of pure gas or reactivation gas needed for reactivation of the adsorption mass.

To operate upon a gaseous mixture containing two main undesirable products, one can also make use of two different adsorption masses, the adsorption capacity of each one being specific towards one of the undesirable products.

The normal operating procedure for the purification of a gas by adsorption, is to obtain in the adsorption working bed, in addition to that required for the pure product, enough gas to regenerate the masses of sections in which the bed is divided.

It has now been found that there is a way to minimize the amount of reactivation gas which is needed to removing the impurities from the adsorption masses.

SUMMARY OF INVENTION

According to the present invention each adsorption bed is divided into two sections. The first section of the bed adsorbs the water from the gases to be purified while the second section adsorbs carbon dioxide.

In accordance with an embodiment of the invention, the regeneration is realized in a first stage by introducing on the adsorption bed countercurrently to the adsorption direction, after depressurizing, a gaseous mixture obtained by combining with a given volume of reactivation gas a stream of gas coming out from between the two sections of the bed, a flow of the mixture equivalent to said volume of reactivation gas being passed through the first adsorption section. According to a further embodiment of the invention, said gas mixture prior to the introduction onto the adsorption bed, is heated and recirculated, for instance, by a blower.

In accordance with another embodiment of the invention, in a second stage, sufficient heat having been put into the bed, the blower is by-passed and the whole of the bed is purged with the pure reactivation gas possibly taken from the product.

In accordance with still another embodiment of the invention, in a third stage, the reactivation blower is restarted and the adsorption bed is cooled by another recirculation gas mixture obtained by combining with reactivation gas a stream of gas coming out from between the two sections of the bed, while, in a fourth stage before pressurizing, the adsorption bed is further cooled by the reactivation gas, possibly taken from the product only.

Alternatively, instead of stages three and four described above, the heated, purged bed can be cooled by the purified feed gas passing through the bed cocurrently to the adsorption direction.

Another object of the invention is any apparatus allowing the adsorption and regeneration according to the above process and particularly any adsorption equipment in which an outlet is provided on the adsorption tank at a suitable level between the two sections of the bed.

BRIEF DESCRIPTION OF THE DRAWINGS

Having thus generally described the nature of the invention, particular reference will be made to the accompanying drawings, showing by way of illustration, the preferred embodiments thereof, and in which.

Figure 1:
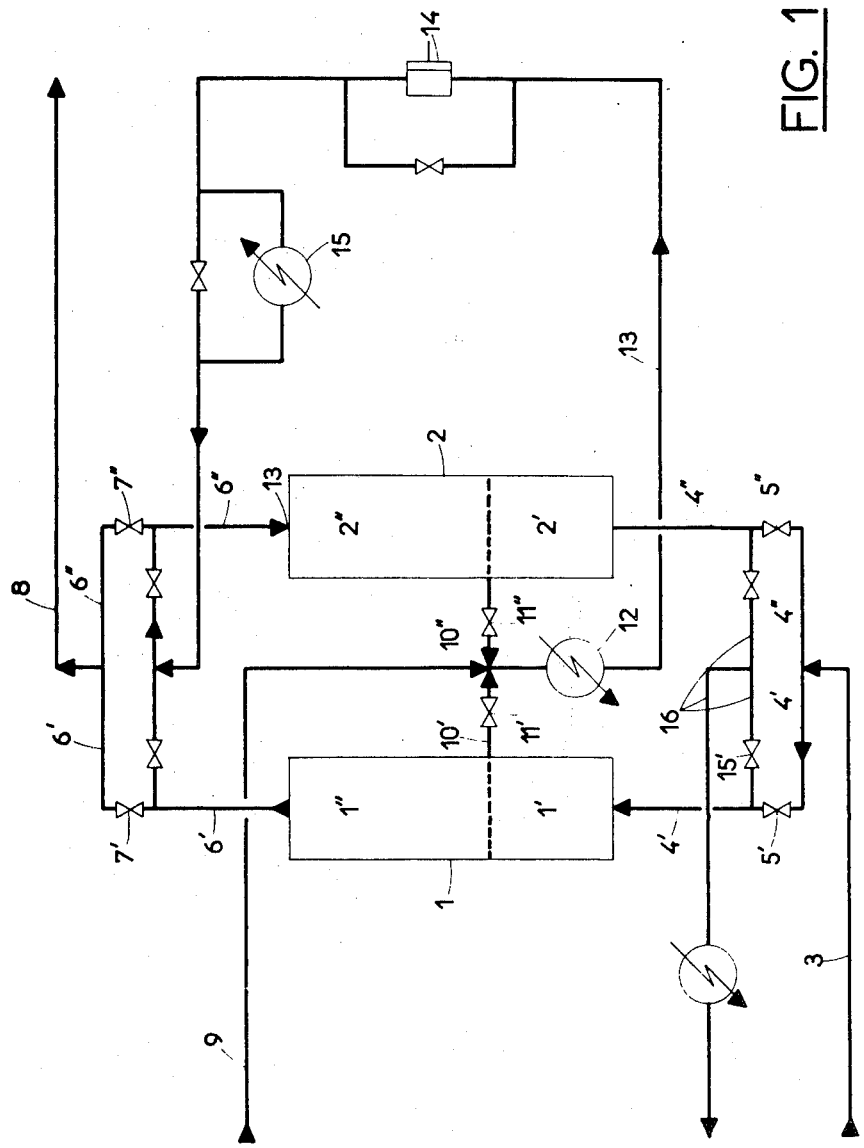
FIG. 1 is a schematic diagram showing a two bed operating procedure.

In the two bed adsorption system shown, FIG. 1, feed gas to be purified is introduced by pipe 3, pipe 4' and valve 5', in an adsorber 1 divided into two sections 1' and 1". The feed gas is purified from $H_2O$ and $CO_2$ respectively removed in sections 1' and 1". The gas leaving adsorber 1 by pipe 6', valve 7' is brought by pipe 8 to a suitable tank (not shown). The gas in pipe 8 is the pure product.

Adsorber 2 is similar to adsorber 1 and contains also two sections 2' and 2" for water and carbon dioxide removal.

While adsorption is carried out in adsorber 1, adsorber 2 is regenerated by the following stages:

by depressurizing during 5 minutes;

by introducing by pipe 13 countercurrently to the adsorption direction, a heated gaseous mixture obtained by combining a volume of reactivation gas brought by pipe 9, with a stream of gas coming out from between the two sections 2' and 2" of adsorber 2 by pipe 10", said gaseous mixture, which remains dry and therefore is suitable for regeneration, having been previously recirculated by a blower 14 and heated in a heater 15.

This stage is carried out during 17 minutes.

The valve 11" on pipe 10" and the valve 15' are opened while valve 5" is closed. Through pipes 4" and 16, a flow equivalent to the volume of reactivation gas introduced by pipe 9 is drawn out from adsorber 2, said flow having been passed over water adsorbing section 2' of adsorber 2.

by further heating adsorber 2 with the reactivation gas only, valve 11" being closed and blower 14 by-passed, the flow leaving adsorber 2 by pipes 4" and 16. This stage is carried on during 25 minutes.

by cooling adsorber 2 with another gaseous mixture, valve 11'' being opened and heater 15 by-passed, obtained by combining with reactivation gas of pipe 9 a stream of dry gas coming out from between the two sections 2' and 2'' of adsorber 2, said gaseous mixture being cooled in cooler 12 and recirculated by blower 14, to be introduced in adsorber 2 by pipe 13. This stage is carried on during 28 minutes.

by cooling adsorber 2 with reactivation gas, valve 11'' being closed, blower 14 and heater 15 by-passed, while cooler 12 is operating. The stage lasts 40 minutes.

by pressurizing with pure feed gas during 5 minutes.

The whole desorption procedure lasts 120 minutes.

Figure 2:
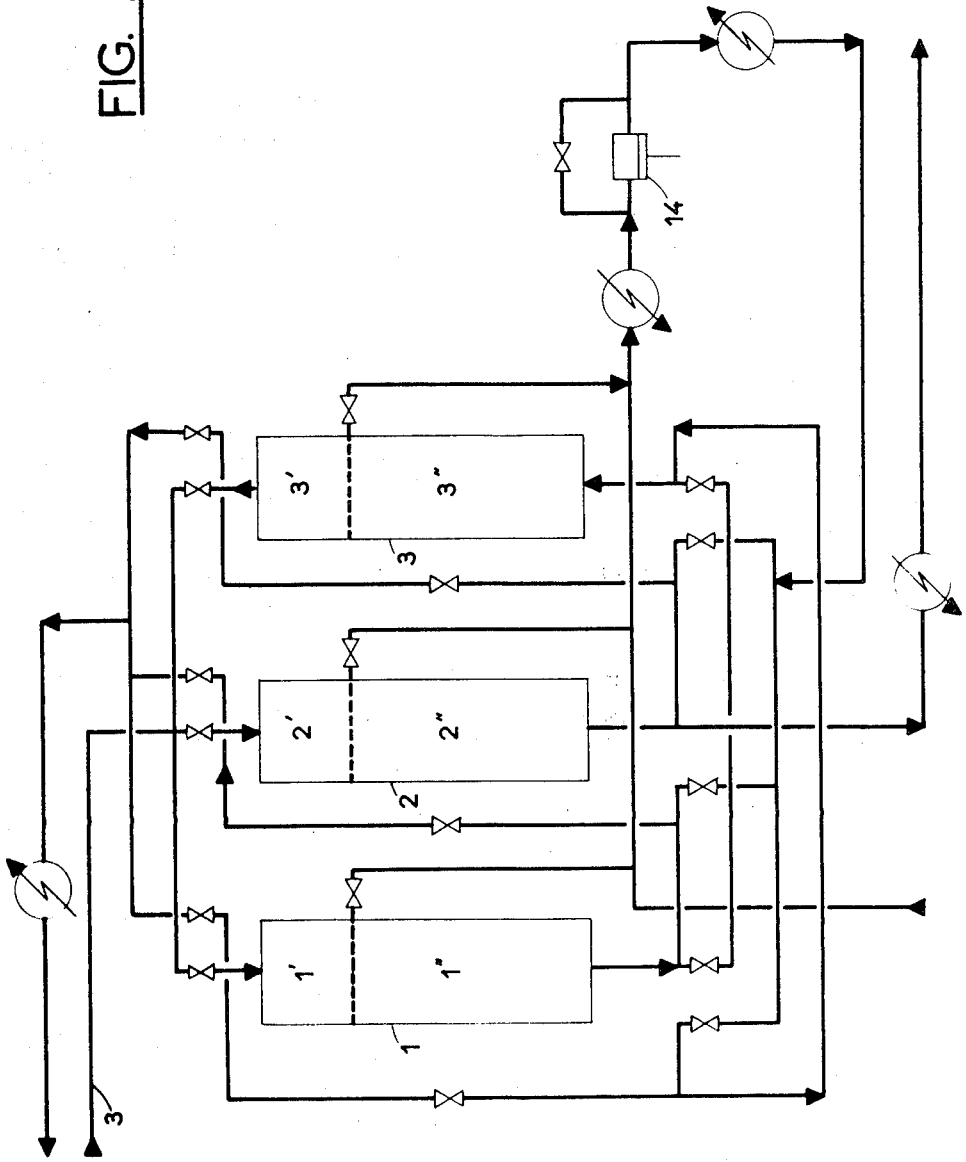
FIG. 2 is a schematic diagram showing a three bed operating procedure.

In FIG. 2, a three bed system is shown. The heating stage of the three-bed system is similar to the heating stage described for the two-bed system.

The carbon dioxide contaminated section 3'' of adsorber 3 for example, is heated with the gaseous mixture obtained by combining reactivation gas and a stream of gas coming out from between the two sections 3' and 3'' of adsorber 3, while the water contaminated section 3' is heated only with a purge stream. After the carbon dioxide contaminated bed has been heated by said gaseous mixture, the heating is carried on with the reactivation gas, possibly taken from the product, only. While the third bed is being regenerated, the second bed is being cooled. Said cooling is accomplished by passing the purified product through the adsorption bed and then through the cooler. Because the bed has been thoroughly heated and purged, no contamination of the product gas will result.

In addition, as the cooling gas flows in the same direction as the feed gas, the cooling stage can be used as a final purification step.

While, for instance, adsorber 1 is working, adsorbers 2 and 3 are regenerated by the following stages:

Time 0 to 5 minutes:
 adsorber 2 is heated by reactivation gas, blower 14 being by-passed
 adsorber 3 is depressurizing.

Time 5 to 10 minutes:
 adsorber 2 is pressurizing with pure feed gas
 adsorber 3 is heated with the gaseous mixture obtained by combining reactivation gas and a stream of gas coming out from between the two sections 3' and 3'' and circulated by blower 14.

Time 10 to 41 minutes:
 adsorber 2 is cooled with pure feed gas coming from adsorber 1
 adsorber 3 is heated with said gaseous mixture obtained by combination of reactivation gas and a stream of gas coming out from between the two sections 3' and 3'' and circulated b blower 14.

Time 41 to 60 minutes:
 adsorber 2 is cooled with pure feed gas coming from adsorber 1
 adsorber 3 is heated with reactivation gas, blower 14 being by-passed.

It is to be understood that the above particular description is by way of illustration, and that changes and modifications might be made without departing from the spirit of the invention which is intended to be limited only as required by the prior art. Particularly, it is to be understood that the reactivation gas may be taken from the product or may be any gas foreseen towards this aim.

Although the undesirable products are water ($H_2O$) and carbon dioxide ($CO_2$) in the description, it is obvious that the products are given by way of illustration of the invention only, without constituting any limitation. Gases may, of course, be purified, which contain a number of other undesirable products.

I claim:

1. A cyclical process of purification of gases containing at least two undesirable products which comprises at least an adsorption step in which the gases are passed on a bed divided according to the adsorption direction in at least a first section, and in a second section a regeneration and pressurizing step are accomplished, said regeneration step consisting of:

a. depressurizing the said adsorption bed;
 b. heating the adsorption bed by forced circulation of a previously heated gaseous mixture counter countercourently to the direction in which the gas was passed during adsorption, said heated gaseous mixture being obtained by combining with a given volume of reactivation gas, a stream of gas coming from between the two sections of the bed, a flow of said mixture equivalent to said volume of reactivation gas being passed through the first adsorption section; and cooling the adsorption bed by passing at least one gas selected from the group consisting of pure reactivation gas, produce gas or combined reactivation gas and the gas from between the bed sections.

2. The process of purification according to claim 1, in which the cooling of the adsorption be is effected by:

d. forced circulation, countercourently to the adsorption direction of the gaseous mixture previously cooled, said gaseous mixture being obtained by combining with reactivation gas a stream of gas from between the two sections of the bed; and
 e. the adsorption bed is further cooled by reactivation gas alone, possibly consisting in purified gas.

3. The process of purification according to claim 1, in which the first section adsorbs one undesirable product while the second section adsorbs at least the other undesirable product.

4. The process of purification according to claim 2 in which the first section adsorbs one undesirable product while the second section adsorbs at least the other.

* * * * *